G. B. EGGERT.
APPARATUS FOR COOLING BREAD AND FOR SIMILAR OPERATIONS.
APPLICATION FILED DEC. 20, 1921.

1,430,160.

Patented Sept. 26, 1922.

Inventor
Gustav Bernhard Eggert

G. B. EGGERT.
APPARATUS FOR COOLING BREAD AND FOR SIMILAR OPERATIONS.
APPLICATION FILED DEC. 20, 1921.

1,430,160.

Patented Sept. 26, 1922.

Inventor
Gustav Bernhard Eggert

G. B. EGGERT.
APPARATUS FOR COOLING BREAD AND FOR SIMILAR OPERATIONS.
APPLICATION FILED DEC. 20, 1921.

1,430,160.

Patented Sept. 26, 1922.
5 SHEETS—SHEET 5.

Inventor
Gustav Bernhard Eggert

Patented Sept. 26, 1922.

1,430,160

UNITED STATES PATENT OFFICE.

GUSTAV BERNHARD EGGERT, OF SAGINAW, MICHIGAN, ASSIGNOR TO BAKER-PERKINS MANUFACTURING CORPORATION, OF SAGINAW, MICHIGAN, A CORPORATION OF MICHIGAN.

APPARATUS FOR COOLING BREAD AND FOR SIMILAR OPERATIONS.

Application filed December 20, 1921. Serial No. 523,692.

*To all whom it may concern:*

Be it known that I, GUSTAV BERNHARD EGGERT, a citizen of the United States, residing at Saginaw, in the county of Saginaw and State of Michigan, have invented new and useful Improvements in Apparatus for Cooling Bread and for Similar Operations, of which the following is a specification.

My invention relates to bread cooling conveyers and similar apparatus, in which the articles to be heated, cooled, dried, baked, fumigated, deodorized or otherwise treated, are carried through the chamber, room, cupboard, open space or the like, intended for their treatment, on trays revolubly mounted at each side in parallel chains moving over sprocket wheels driven by power. The purpose of my invention is to render these operations more effective, secure and automatic throughout, including the loading and unloading of the trays, to save considerably on the initial costs of construction, and to enable repairs and replacements of damaged parts to be made quickly and easily.

To this end, I suspend the trays, each carrying a number of articles side by side through the apparatus, from the chains in an inclined position, forming, when fully loaded, an acute angle with the horizontal. I construct these trays to consist of a light flat front part, forming the platform for supporting the bottom of the articles and of a heavier backpart, in which one end of the platform is fixed, the other end being free, and against which the articles rest sidewise, both, the platform and the backpart, being rigidly connected at each end to brackets of such a shape that practically all their weight is on the side of the backpart, thus making the latter still heavier than the frontpart. These brackets are provided with short shafts—one for each—pointing outside the trays vertically to the direction of their travel and revolubly mounted in bearings contained in the chains carrying the trays through the apparatus. The shafts are arranged coaxially to each other and fixed to the brackets above the center of gravity of the trays at such a point as to make the distance of their common axis, round which the tray oscillates, from the tip of its platform greater than that from the outer end of its backpart, so that, in consequence of the latter being heavier than the former, the tray when in equilibrium, also when loaded, is in the required inclined position, the free end of its platform pointing upwards. The slanting position of the trays prevents the articles thereon from moving about or dropping from the platform, even when the trays are accidentally swung most violently to and fro. I preferably regulate the overweight of the backparts of the trays, if necessary by counterweights, so that, when fully charged, their platforms form an angle of 30° with the horizontal.

I employ, as is usual in apparatus of this kind, two parallel endless chains of equal length, running over sprocket wheels mounted in pairs of equal size on rotary shafts carried in stationary supports. I preferably use roller chains, fitting the bearings for the shafts carrying the trays in the links. The trays are distributed on the chains at regular intervals and as near as possible to each other. The chains are arranged zig-zag fashion, and I preferably arrange in the mainpart—the treating zone—of the apparatus a number of superimposed horizontal courses. In consequence of the above described arrangement of the chains, I am enabled to use smaller sprocket wheels, where the backparts point towards the shafts of the sprockets, than at those points, where the tips of the platforms face the same. The proportionate size of the smaller and larger sprocket wheels is determined by the difference between the distance of the axis, round which the trays oscillate, from their backparts, and that from the tips of their platforms. The employment of the smaller sprocket wheels—quite half the total number used in most cases—effects a considerable saving of space, especially in the sections where several horizontal courses of the chains are superimposed on each other.

The platforms of the trays may be made of any suitable material, wood, metal, enamelled ware, porcelain, ebonite or the like, while their backparts and the brackets, acting combined as the inner support of the whole structure, in general mainly consist of metal, mostly iron. As hot bread may suffer in appearance and even color by touching iron surfaces, the platforms of the trays for bread cooling conveyers are usually made of wood, preferably maple, and the side of its backpart, against which the loaves lean, is protected by a thin wooden board.

For loading and unloading the trays, I arrange in the course of the chains, preferably outside the treating zone of the apparatus, a loop having two vertical sections, one connected to the entrance into the treating zone of the trays carrying the fresh articles to be treated, and the other one to the exit from the same of the trays containing the treated articles. The trays are loaded, while they travel upwards along the vertical section of the loop, connected to the entrance, and unloaded, while they pass downwards the opposite section, connected to the exit of the treating zone. Guideboards, placed alongside the two vertical sections of the loop, and projections, provided at the sides of the trays, serve to steady and retain the latter in the proper position and inclination required for these operations, during which the trays are not only unavoidably shaken, but their center of gravity is considerably changed. In order to do this work automatically, I preferably construct the platforms of the trays of a number of parallel rods or slats placed at a suitable distance from each other, having one end free and fixed with their other end in the heavier back part of the tray as mentioned above, arrange the loading chute, composed wholly or in its lower part of similar rods or slats placed at a similar distance from each other and free at their lower ends, across and reaching downward to within the upward passage of the trays so, that, when the rods or slats of the platforms of the latter pass upwards through between those of the chute, they pick up and carry upwards the articles contained on its lower end, and place the unloading chute, constructed wholly or in its upper part in a similar way, across and reaching upward into the downward passage of the trays in such a manner, that, when the rods or slats of the latter pass downwards through between those of this chute, the articles, supported by the former, are retained by and then slide down the latter. As guides for the trays during their passage along the vertical sections of the loop, I employ, as mentioned above, projections—hereinafter called "bosses"—extending from the outer sides of the tray brackets, and preferably place the bosses to serve during the loading operation at one and the same, say the right, sides of the trays below, and the bosses to act during the unloading operation at the opposite, say the left sides of the trays above the axes round which the latter turn. The bosses are of such a shape and dimensions that they extend nearly to, but do not touch nor interfere with the chains and easily glide between two opposite guideboards arranged along those sides of the vertical sections of the loop, in which they are intended to become active. By broadening these guideboards so as to include the nearest chains, and by arranging narrower guideboards for the chains only at the sides opposite to the active bosses, the trays are completely steadied in regard to their vertical movement, while possible side-oscillations of the chains and trays are prevented by providing along each side of the two vertical sections of the loop vertical bars closely to the ends of the shafts carrying the trays and protruding from the chains. The guideboards and bars may be made of wood, iron or any other suitable material and are advantageously joined at their edges to channel-like structures. In order to facilitate the entrance of the bosses into between the guides, their side walls are curved outwards at that end where they enter the same.

The relative position of the shafts carrying the trays and of the guide bosses is in most cases such that they advantageously act together as guides, the shafts always entering first into between the guideboards, the bosses following; the latter are then in general of a very simple construction, preferably circular protuberances.

In general, the trays, while passing upwards along the loading section of the loop, are rigidly kept by the loading guides in the same slanting position in which they travel through the treating zone of the apparatus, but, while they pass downwards along the unloading section of the loop, the opposite, the unloading guides force and retain their platforms in a position as nearly horizontal as possible.

The lower ends of the rods forming the loading chute are bent upwards or provided with a hook or the like, in order to retain the articles thereon, and so arranged in regard to the rods forming the trays, that, when the latter pass through between the former, only a single or a predetermined number of rows of articles are carried upwards by the trays, while those remaining on the chute are in no way interfered with. The latter condition is mainly dependent on the distance of the ends of the chute rods from the outer tips of the tray rods during charging; in order to be able to use the same tray for articles of different size or different numbers of rows of articles—that is different in their dimension parallel to the rods—I regulate this distance in accordance to the latter, preferably by providing means for moving the lower end of the chute parallel to the rods of the tray as required. I construct for this purpose the loading chute of two distinct members, an upper stationary and a lower movable one, the upper parts of the rods of the latter extending parallel to and in the same plane in the interstices of the lower parts of the rods of the former.

The upper parts of the movable member of the chute are rigidly fixed to crossbars mounted at both ends protruding over the sides of the chute on blocks sliding in stationary guide-blocks and provided with racks worked by pinions mounted on a common shaft rotating in stationary supports.

From the unloading chute the treated articles, deposited thereon by the trays moving downwards along the unloading section of the loop, slide usually onto an ordinary conveyer carrying them to their destination.

The accompanying drawings, which serve for more fully describing and explaining the novel features and devices and the working of my invention, represent an example of its application to an apparatus used for cooling loaves of bread. While I thus illustrate my invention, it must be clearly understood that I in no wise limit the same to the one contruction and form shown, as it will be evident to those skilled in the art that other apparatus may be designed or existing ones may be altered in such a way that they, though differing in shape and many details, yet contain the essential constructional parts and devices forming my invention, as clearly defined in the attached claims.

In Figs. 6 and 8 the tray is in the horizontal position for unloading, the guides retaining it therein and the chains, from which it is suspended, being shown in cross section, and in Figs. 7 and 9 the tray is in the inclined position for being loaded, the guides keeping it therein and the chains carrying it being represented in elevation.

Figs. 4, 5, 6 and 8 demonstrate how the various parts of the tray are joined together.

In all these figures like numerals of reference indicate corresponding parts serving the same or a similar purpose.

The numeral 1 designates the trays on which the loaves of bread to be cooled are carried through the apparatus, and 2 the two endless parallel chains from which the trays 1 are revolubly suspended. The course of the chains is divided into a number of superimposed horizontal sections 3 forming the mainpart of the apparatus, where the cooling of the hot bread takes place, and a loop ending in the vertical sections 4 and 5. The trays 1 are charged with the loaves to be cooled while passing upwards the vertical section 4 to the end of the upmost horizontal section 3, travel zigzag wise through all these sections, and then move downwards from the end of the lowest section 3 along the vertical section 5, where the cooled loaves are discharged.

The trays 1 consist essentially of a light platform 6, capable of holding a row of loaves, and a short backpart 7, which is so much heavier than the longer frontpart of the trays that their platforms, also when fully loaded, are forced to remain in an inclined position, forming as shown an angle of about 30° with the horizontal. The distance of the axis 8, round which the trays 1 turn in their chains 2, from the end of the front of the platform 6 being so much greater than that from the end of the backpart 7, the diameter of the sprocket wheels, round which the chains 2 turn and which are rigidly mounted in aligned pairs at equal distances from each other on the shafts 9, may be accordingly smaller, when the back part 7 of the tray, turning round the sprocket, points towards the shaft 9, than when the front of the platform 6 faces the same. In the construction shown, the proportion of the diameter of the smaller sprocket wheel to that of the larger one is about equal to two to three, and the total combined height of the horizontal sections 3 is in consequence so much lower than if only large sprockets were used.

The larger sprocket wheels are designated by the numeral 10, and the smaller ones by 11. The shafts 9 are revolubly mounted parallel to each other in the framework 13 of the apparatus and rotated by the gearing 14 in the direction shown by the arrows.

The platform 6 of the tray 1 is composed of a suitable number of wooden slats 15 held parallel to and at equal distance from each other in the grooves 16, cut in the wooden bar 17, by means of the side resting thereon of the angle iron 18, both the bar 17 and the angle iron 18 extending the whole length of the tray 1 and forming together its backpart 7. The screw bolts 19, passing through openings arranged in line in the backbar 17, the slats 15 and the angle iron 18, and their nuts 20 serve to firmly fasten all three together; in this way a damaged slat can be easily and quickly replaced by unscrewing the nut 20, removing the bolt 19 and then the damaged slat 15 from its groove 16, fitting therein a new slat, putting the bolt 19 back again and tightening its nut 20. The backbar 17 and the angle iron 18, thus fastened together, are carried at one end by the bracket 21 and at the opposite end by the bracket 22, each of the two brackets having a wing-like projection 23, parallel to the upright of the angle iron 18 and fixed thereto by means of the bolt 24 and the nut 25, and at its lower end a similar projection 26 fitting in a groove 27, cut in the lower part of the adjoining end of the backbar 17, and provided with an opening corresponding to that in the latter for the nearest bolt 19, which thus not only holds the first slat 15 in its place, but fixes the backbar 17 and angle iron 18—thus doubly secured—to the bracket. The upright part of the angle iron, vertical to the slats 15—forms the back of the tray 1 supporting the articles placed on its inclined platform 6, and, as hot bread must not remain for any length of time in touch with iron, it is protected by a thin wooden board 28 fixed by the screws 29. Each of the brackets 21 and 22 is provided at corresponding places of its side, opposite to that having the projections 23 and 26, with a short shaft or trunnion 30 forming one piece with or screwed or otherwise fastened in the flange-like protuberance 31 and so arranged, that their axes are situated in the same straight line identical with the axis 8 mentioned above, and that the carrying surface of the platform 6 is parallel thereto. The shafts 30 are revolubly mounted in the chains 2 in such a manner that, when the latter are in their proper position, the axes of the former are vertical to the course of the chains. The shape of the brackets 21 and 22 and the construction of the platform 6 and backpart 7 are such, that, when the tray 1 is freely swinging on the shafts 30 between the chains 2, the platform 6 points upwards and the backpart 7 downwards. In case the platform 6, when loaded, does not form an angle of about 30° with the horizontal, which is advantageous as mentioned above, the weight of the backpart 7 is regulated by counterweights or the like so as to conform with this requirement.

The trays 1 are loaded and unloaded by means of inclined chutes—32 for loading and 33 for unloading—which essentially consist of rods extending between the slats 15 of the platform 6. During these operations the trays 1 are steadied, in order to retain their proper position, by means of special guides, 34 for loading and 35 for unloading them. The charging chute 32 is arranged across the vertical section 4 outside the loop in the course of the chains 2, slanting downwards toward the same and composed of the rods 36 which are bent upwards at their lower ends 37 preventing the loaves, sliding down the same, from dropping off, when a tray should not be ready to receive them. For steadying the trays 1 during their upward passage along the vertical section 4, the bracket 21 is provided with the boss 38 situated below the flange 31—vertically when the tray is in its required slanting position— and loosely fitting between the two side walls of the guide 34 arranged along the vertical section 4; for facilitating the entrance of first the flange 31 and then the boss 38 into the guide 34, the lower ends 39 of its side walls are curved outwards. The discharging chute 33, consisting of the rods 40, is arranged across the vertical section 5 inside the loop and inclined from the same towards the conveyer 41 carrying the discharged cooled loaves from between the two vertical sections of the loop to their destination, usually the wrapping machines. In order to remove the cooled loaves as quickly and as easily as possible from the trays passing downward the vertical section 5, and to prevent the loaves, while being unloaded, from being damaged by the immediately following tray, it is necessary that the platforms 6 of the trays are during this time in an as nearly as possible horizontal position; for this purpose, the brackets 22 are provided with the branch 42 projecting vertically above the flange 31 and carrying the boss 43 loosely fitting between the side walls of the guide 35, which is arranged along the vertical section 5. For causing first the flange 31 and then the boss 43 easily to enter the narrow passage of the guide 35, the upper ends 44 of its side walls are curved outwards. For further steadying the trays 1 in their travel along the vertical sections 4 and 5, I arrange along the same at the sides opposite to the guides 34 and 35 the guides 45, the narrow side walls of which only inclose the chains 2, while they leave the bosses at their side of the trays free for any play. Any accidental side movements of the trays, which might seriously damage the working of the apparatus by the slats 15 of the trays fouling the rods 36 of the charging chute 32 or the rods 40 of the discharging chute 33, are avoided by constructing the guides 34, 35 and 45 as channels, (Figs. 7, 8, 9, and 10) the bottom walls of which run closely to the ends of the shafts 30 slightly protruding from the chains 2.

Figures 1, 2, 3:
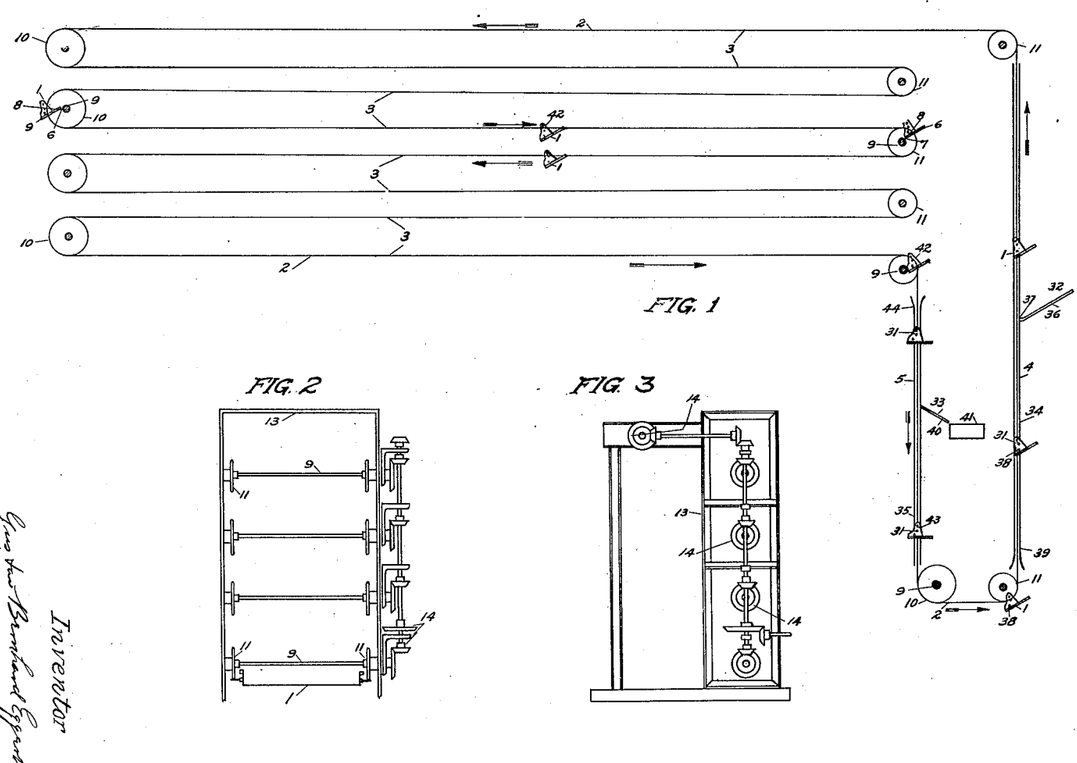
Fig. 1 demonstrates diagrammatically the principles of constructing a bread cooling conveyer according to my invention.
Fig. 2 shows a cross section of a tier of sprocket wheels, over which the horizontal sections of the conveyer travel, and their driving gear.
Fig. 3 is a side view of the latter.
Figures 4, 5, 6, 7:
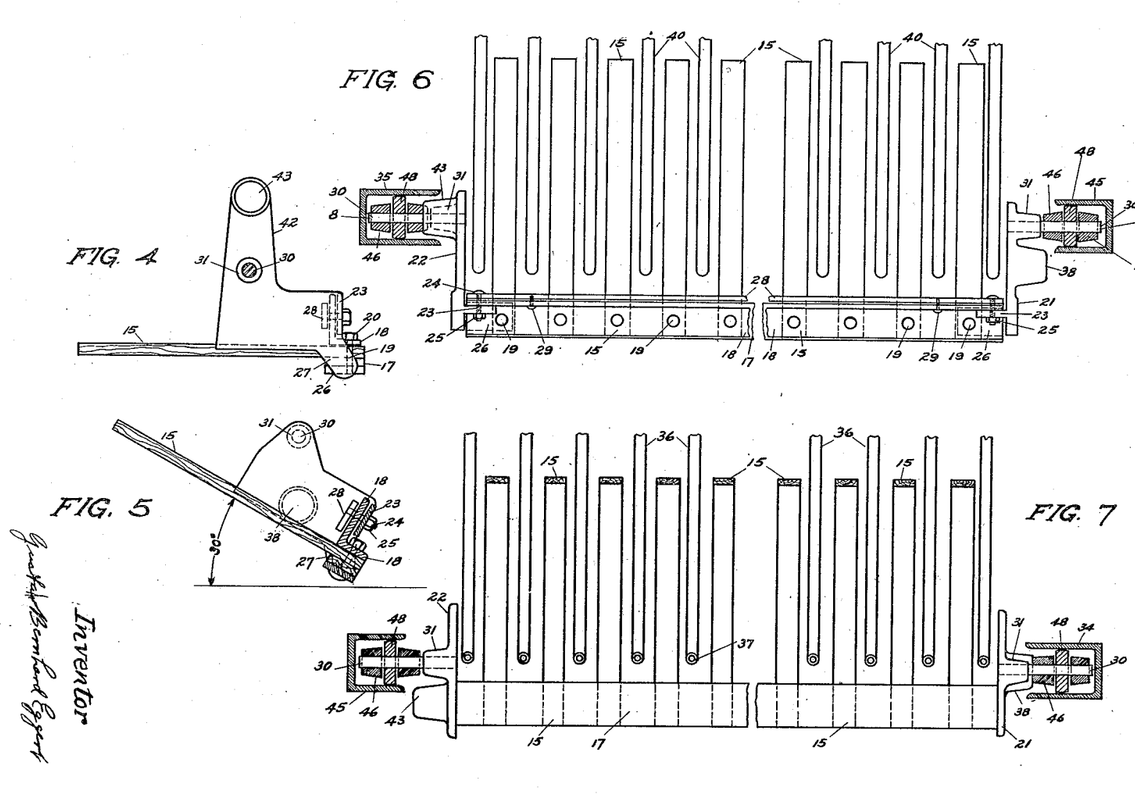
Fig. 4 is a side view—from outside—of the tray bracket with the unloading boss, the platform of the tray being shown in the horizontal position, ready for the discharge of the cooled bread therefrom.
Fig. 5 is a side view—from inside—of the opposite tray bracket with the loading boss, the platform of the tray being inclined about 30° from the horizontal, in which position it is loaded and travels through the apparatus.
Figs. 6 and 7 are top views and Figs. 8 and 9 back views of the tray.
Figure 8:
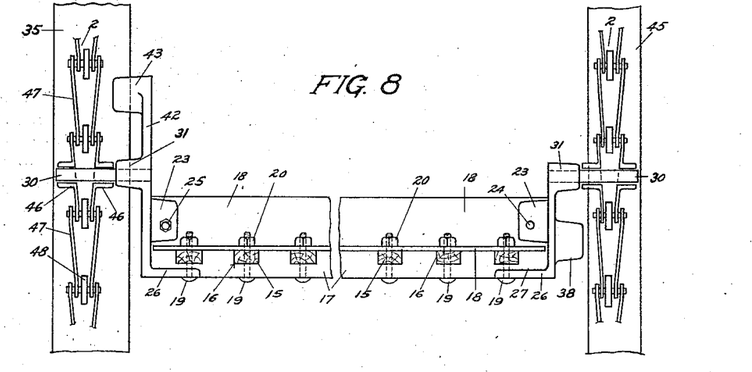
Figure 9:
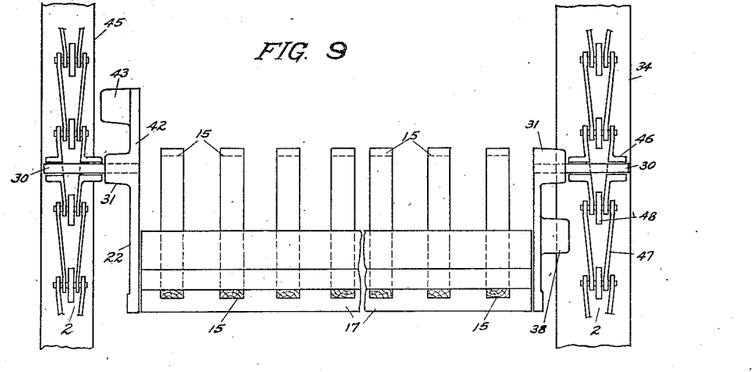
Figure 10:
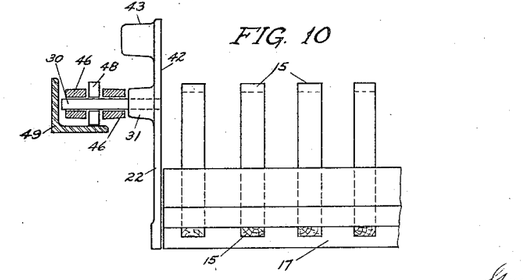
Fig. 10 shows the manner in which the trays may be supported in the horizontal sections of their course.

I preferably use the roller-type chains shown, the shafts 30 of the trays 1 turning in bearings 46 provided at regular intervals in the links 47, and the rollers 48 travelling in the horizontal sections 3 on the horizontal side of the angle irons 49 rigidly fixed along the same in the framework of the apparatus, the upright parts of these angle irons preventing any side movement of the chains, and in the vertical sections 4 and 5 of the loop closely between the side walls of the guides 34, 35 and 45; this construction minimizes friction and greatly contributes to the silent and effective working of the apparatus.

Figure 11:
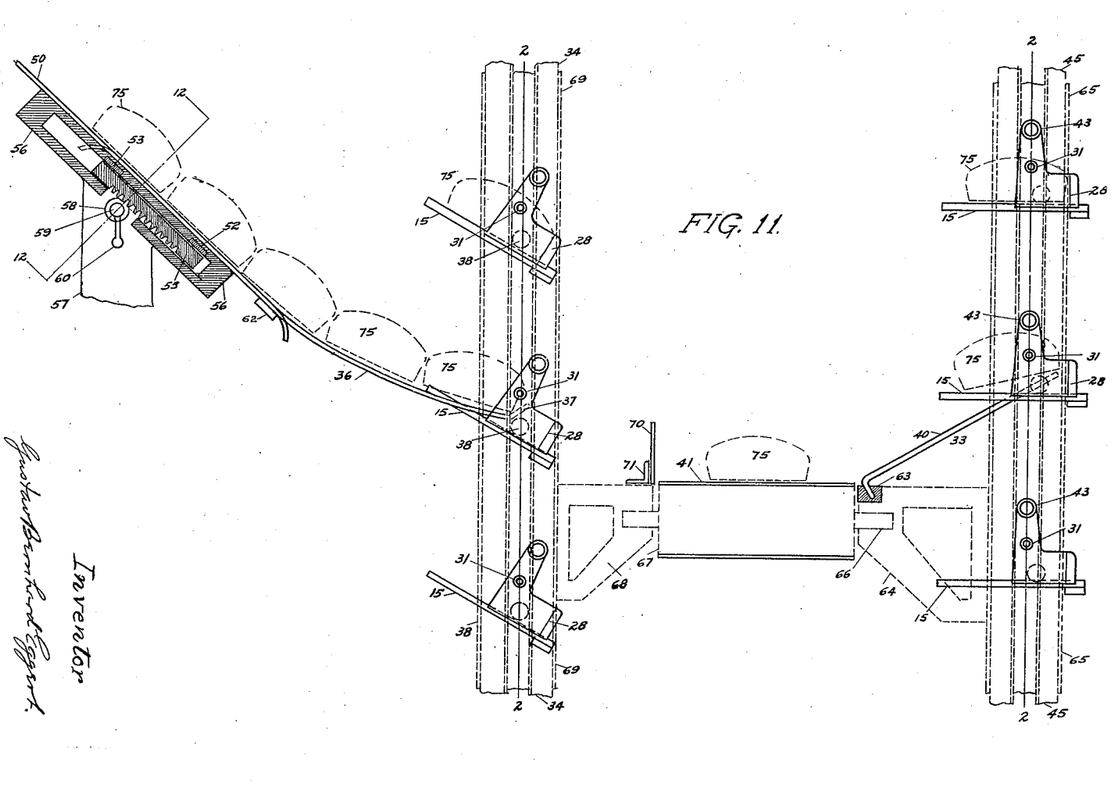
Fig. 11 represents a longitudinal section through the loading and unloading devices of the apparatus.
Figure 12:
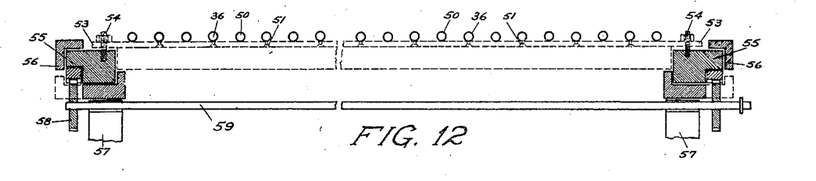
Fig. 12 is a cross section on the line 12—12 of Fig. 11, showing the regulating device of the loading chute in double the size as in Fig. 11.
Figure 13:
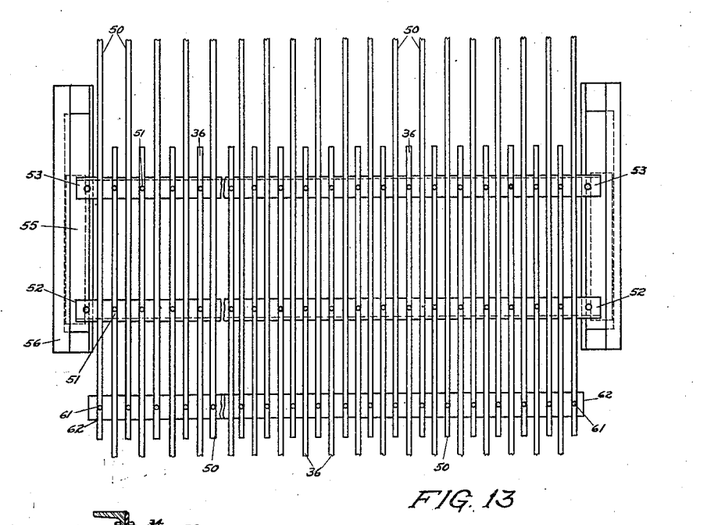
Fig. 13 is a plan view of this chute, explaining the arrangement towards each other of the movable and stationary rods composing the platform of the same.

In order to be able to fill the charging chute with several rows of loaves for equalizing the small irregularities, with which they will arrive from the oven or bread righting apparatus, to pick out the lowest row of loaves—that resting on the hook 37—without upsetting or disturbing the next successive row, and to make the same tray available under these unavoidable circumstances for any size of loaves, it is necessary to regulate in accordance with the size of loaves to be cooled the distance of the hook 37 from the tip of the slats 15 forming the platform 6 of the trays. For this purpose, the charging chute 32, shown in Figs. 11, 12 and 13, is constructed of the movable lower part comprising the rods 36 extending between the slats 15 of the trays passing by, and of the upper stationary part composed of the rods 50, the lower parts of which are situated in the same plane with and between the upper parts of the rods 36. The latter are rigidly fixed by means of the screws 51 to the flat crossbars 52 and 53 which are mounted at each end by means of the screws 54 on the rack blocks 55 sliding within due limits in the guide blocks 56 rigidly attached to the framework 57 of the apparatus. The rack blocks 55 are worked by the pinions 58, reaching the same through openings shown in the lower sides of the guide blocks 56. The pinions 58 are mounted on the common shaft 59 revolubly carried in bearings provided in the upper parts of the framework 57 and rotated by means of the handle 60. The rods 50 are fastened by the screws 61 to the flat crossbar 62. The upper ends of the rods 36, extending beyond the bar 52, and the lower ends of the rods 50, reaching over the bar 62, are bent downwards in order to prevent them from interfering with the loaves rushing down the chute. The lower parts of the rods 36 are bent upwards at their ends to form the hooks 37, and preferably curved, as this shape assists in the settling of the loaves in their due position for being carried upwards by the trays. This construction of the charging chute 32 has also the great advantage that, provided the loaves are of fairly regular and equal size, which is in general always the case, and provided the position of the chute is accordingly regulated, always a full row of loaves is taken away by the slats of the tray passing through, as long as the lowest row of loaves—resting against the hooks 37—is complete, may also the upper rows of loaves be incomplete in their number.

The lower ends of the rods 40 of the discharging chute 33 (Figs. 11 and 14) are bent downwards and rigidly mounted in the bar 63 extending along the side of the conveyer 41 and carried by the brackets 64 fixed to the upright channel irons 65 serving at the same time as supports for the guides 35 and 45, arranged along the vertical section 5. The conveyer 41 shown is of the canvas belt type; the shaft 66 of the roller 67, on which the belt runs, is rotatably mounted at one side in the bracket 64 and at its opposite side in one of the brackets 68 fixed to the channel irons 69 supporting at the same time the guides 34 and 45 running along the vertical section 4. For preventing the loaves, sliding down the rods 40 of the chute 33, from shooting over the opposite edge of the conveyer 41, the plate 70 is placed along the same; it is bolted to the angle iron 71 mounted on the brackets 68. The plate 72, extending across the conveyer 41 near to the first rod 36 and fixed by means of the angle iron 73 to the plate 70 and the angle iron 74 to the bar 63, is intended to retain on the conveyer any loaves accidentally rolling towards the end of the same.

The loaves 75 shown in dotted outline in Figure 11 demonstrate their various positions on the chutes 32 and 33. Though the loaves are taken upwards by the very front part of the platform 6, they slide immediately down the same against the board at the back of the tray, as the latter is always kept in the slanting position during its passage along the vertical section 4.

Figure 14:
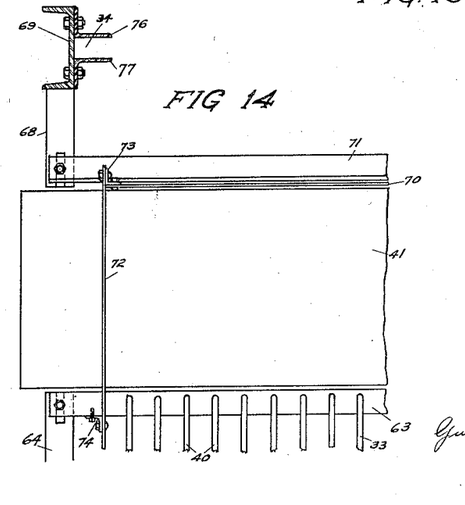
Fig. 14 shows a simple form of construction of the guide channels for the trays, and the arrangement of the conveyer carrying away the cooled loaves sliding down from the unloading chute.

I preferably construct the guides 34, 35 and 45 of angle irons as shown for example in regard to the guide 34 in Fig. 14. The angle irons 76 and 77 are bolted with one side—angles pointing towards each other—to the broad bottom of the channel iron 69, their upright sides being parallel to each other and forming the sidewalls of the guide 34.

As is clearly seen from this description, from the moment the loaves to be cooled touch the charging chute 32, the apparatus performs the whole operation automatically, and the bread is never touched by hand, until it has been wrapped or is otherwise disposed of.

I claim:

1. In an apparatus of the kind described, in combination a pair of parallel endless chains arranged in zig-zag fashion, a plurality of trays carrying the articles through the apparatus, each tray consisting of a light and wide front part forming the platform, on which these articles rest, and a narrow back part supporting the front part and so heavy and so arranged in regard to the latter as to place the center of gravity of the tray considerably nearer to the end of its back part than to that of its front part, short shafts revolubly mounted in the said chains, vertically to their course and fixed, one to each side of each of the said trays at such points above their center of gravity that, when in equilibrium, the said trays are in an inclined position frontpart upwards, the distance of the axis, round which the said trays turn, from the end of their frontpart being greater than that from the end of their backpart, sprocket wheels on which the said chains run, and shafts having the said sprocket wheels affixed thereto and revolubly mounted in stationary supports, those of the said sprocket wheels situated at the points, where the frontparts of the said trays moving round the same face the said shafts, having in proportion to the difference of the above distances larger diameters than those situated at the points, where their backparts face the same.

2. In an apparatus of the kind described, in combination a plurality of trays, each being composed of an open and light platform provided as support for the bottom of the articles to be treated, a heavy and thick crossbar in which one end of the said platform is securely fixed, the other end being free, an upright mounted on the said crossbar along its whole length and serving as support for one side of the said articles, brackets—one for each side of this crossbar—provided with projections to which the latter is bolted, and short shafts—one for each bracket—pointing outside the tray vertically to the direction of its travel and being placed at such a point that, when the said tray is duly charged, its platform forms an acute angle with the horizontal, two endless parallel chains moving the said trays through the apparatus, bearings arranged at regular intervals in the said chains for the shafts of the said trays to turn in, larger sprocket wheels for the said chains to run on at points where the platforms of the said trays point inside the same, and smaller ones, where these platforms point outside the same, the proportion of the diameters of the said larger sprocket wheels to those of the said smaller sprocket wheels being determined in accordance with the proportion of the distance of the axis, round which the trays turn, from the outer tips of their platform to that from the outer ends of their crossbar.

3. In an apparatus of the kind described, the combination of a pair of endless chains with a plurality of trays revolubly suspended from and between the said chains, each of the said trays comprising: a platform holding the articles under treatment and composed of a number of wooden slats placed at regular intervals vertically to the travel of the said trays, a stout wooden crossbar, in which the said slats are fixed with one end, the other end being free, an angle iron placed on top of and having the same length as the said crossbar, screw bolts passing through the crossbar, the slats and the side resting thereon of the angle iron and holding all three together, side brackets provided with wing-like projections, one parallel to the said crossbar and fastened to the same by screw bolts passing at the same time through the side resting thereon of the angle iron, and the other one parallel to the upright side of the latter and bolted thereto, a thin lath of wood fastened to the upright side of the said angle iron for the said articles to lean against, and two shafts, one projecting from each of the said brackets and revolubly mounted in bearings contained in the said chains, the said shafts being fixed to the said brackets at such points and the proportion of the weight of the heavier backpart to that of the lighter frontpart of the said trays being so regulated that their platforms form an angle of about 30° with the horizontal.

4. In an apparatus of the kind described, in combination a pair of parallel endless chains, a vertical loop included therein and containing two vertical sections, one connected to the entrance to and the other one to the exit from the treating zone of the apparatus, a plurality of trays revolubly suspended from and between the said chains, two bosses projecting—one from each side of the said trays and extending nearly to the said chains, one adapted to serve as guide during loading, and the second at the opposite side during unloading, two opposite guideboards fixed parallel to the said chains along that vertical section of the said loop connected to the entrance of the treating zone and loosely inclosing the said boss for loading, both, the latter and the said guideboards being so arranged and adapted as to place and retain the said trays in the proper loading position, and two opposite guideboards running parallel to the chains along that vertical section of the said loop connected to the exit of the treating zone and loosely inclosing the said boss for unloading, both the latter and the last named guideboards being so arranged and adapted as to place and retain the said trays in the proper unloading position.

5. In an apparatus of the kind described, in combination a pair of parallel endless chains, a loop included in the course of the latter and ending in two vertical sections, one connected to the entrance to, and the other one to the exit from the treating zone of the apparatus, a plurality of trays revolubly suspended from and between the said chains, bosses provided at the said trays and extending,—one from each side thereof,—nearly to the said chains, one boss adapted to serve as guide during loading and the second at the opposite side during unloading, two opposite wider guideboards fixed parallel to the said chains along that side of each of the vertical sections of the said loop, where the active ones of the said bosses pass, and inclosing the latter and the said chains, and two opposite narrower guideboards fixed parallel to the said chains along that side of the vertical sections of the said loop, where the bosses remain inactive, and including then only the said chains.

6. In an apparatus of the kind described, in combination a pair of parallel endless chains, a loop included in the course of the latter and ending in two vertical sections, one connected to the entrance to, and the other one to the exit from the treating zone, a plurality of trays revolubly suspended from and between the said chains, bosses provided at the said trays and extending— one from each side thereof—nearly to the said chains, one boss adapted to serve as guide during loading, and that one at the opposite side during unloading, and opposite guideboards two fixed parallel to the said chains along that side of each of the vertical sections of the said loop, where the active ones of the said bosses pass, inclosing the latter, and curved outwards at that end where the said bosses, when to be active, enter between them.

7. In an apparatus of the kind described, in combination a pair of parallel endless chains, a loop included in the course of the latter and ending in two vertical sections, one connected to the entrance to, and the other one to the exit from the treating zone of the apparatus, a plurality of trays holding the articles under treatment, shafts— one provided at each side of the said trays— revolubly mounted in the said chains, bosses provided at the said trays and extending— one from each side thereof—nearly to the said chains, one boss adapted to serve as guide during loading and the other one during unloading, and four channels, one fixed along each side of the vertical sections of the said loop, the bottom of each channel being situated closely to the ends of the said shafts protruding from the said chains, two of the said channels—one for each section—having wider sides so as to inclose the said bosses and the said chains, and the two other ones having narrower sides and inclosing the latter only.

8. In an apparatus of the kind described, in combination a pair of parallel endless chains, a loop included in the course of the latter and ending in two vertical sections, one connected to the entrance to and the other one to the exit from the treating zone of the apparatus, a plurality of trays holding the articles under treatment, flange-like projections—one provided at each side of the said trays, shafts fixed in the said flanges and revolubly mounted in the said chains, bosses provided at the said trays and extending—one from each side thereof—nearly to the said chains, one boss adapted to serve as guide during loading and the other one during unloading, and opposite guideboards, two fixed parallel to the said chains along that side of each of the vertical sections of the said loop, where the active ones of the said bosses pass, and including the latter as well as the said flange-like projections.

9. In an apparatus of the kind described, in combination a pair of parallel endless chains, a loop included in the course of the latter and ending in two vertical sections, one connected to the entrance to and the other to the exit from the treating zone, a plurality of trays revolubly suspended from and between the said chains, a platform arranged in each of the said trays for holding the articles under treatment and consisting of a row of rods fixed with one end in the backpart of the said trays, the other end being free, a stationary loading chute extending across that section of the said loop connected to the entrance of the treating zone, inclined downwards towards this section and composed of a row of rods, the lower part of which is free and so arranged, that the rods of the said platforms, travelling upwards, pass freely through between, carrying with them the articles placed on the said chute, bosses to serve as guides during loading, provided at one end and the same side of each of the said trays, two opposite guideboards fixed alongside the last named section so as to include the said loading bosses, a stationary unloading chute extending across that section of the said loop connected to the exit of the treating zone, inclined downwards from this section and composed of a row of rods, the lower part of which is free and so arranged that the rods of the said platforms, travelling downwards, pass freely through between, leaving thereon the treated articles, bosses to serve as guides during unloading, provided at each of the said trays at the side opposite to that of the above named bosses for loading, and two opposite guideboards fixed alongside the last named section so as to include the said unloading bosses.

10. In an apparatus of the kind described, in combination a pair of parallel endless chains, a loop included in the course of the latter, a vertical section forming part of the said loop and connected to the entrance to the treating zone of the apparatus, a plurality of trays revolubly suspended from and between the said chains, a platform arranged in each of the said trays for holding the articles under treatment and consisting of a row of parallel rods fixed with one end in the backpart of the said trays, the other end being free, a stationary loading chute extending across the said section, inclined downwards toward the same and composed of a row of parallel rods, the lower part of which is free and so arranged that the rods forming the said platforms, when travelling upwards, pass freely through between, carrying with them the articles placed on the said chute, means provided at the lower end of the latter for preventing these articles from dropping off, bosses to serve as guides during loading provided at one and the same side of each of the said trays, and two opposite guideboards fixed alongside the above named section so as to include the said bosses.

11. In an apparatus of the kind described, in combination a pair of parallel endless chains, a loop included in the course of the latter, a vertical section forming part of the said loop and connected to the entrance to the treating zone of the apparatus, a plurality of trays revolubly suspended from and between the said chains, a platform arranged in each of the said trays for holding the articles under treatment and consisting of a row of parallel rods fixed with one end in the backpart of the said trays, the other end being free, a loading chute extending across the said section, inclined downwards towards the same and consisting of an upper stationary and a lower movable member, a row of parallel rods free in their lower part and bent upwards at their lower end, forming the movable member of the said chute and so arranged that the rods of the said platforms, when travelling upwards, pass freely through between, carrying with them the articles contained on the lower part of the said chute, means adapted to regulate the position of the movable member of the said chute so that the distance of the lower ends of the latter from the front ends of the said platforms passing through corresponds to the length of the articles to be carried, bosses to serve as guides during loading provided at one and the same side of each of the said trays, and two opposite guideboards fixed alongside the above named section so as to include the said bosses.

12. In an apparatus of the kind described, in combination a pair of parallel endless chains, a loop included in the course of the said chains, a vertical section forming part of the said loop and connected to the entrance to the treating zone of the apparatus, a plurality of trays revolubly suspended from and between the said chains, a platform arranged in each of the said trays for holding the articles under treatment and consisting of a row of parallel rods fixed with one end in the backpart of the said trays, the other end being free, a movable chute composed of a row of parallel rods, inclined downwards toward the said section, extending the whole width of the latter, bent upwards at their lower ends and so arranged that the rods forming the said platforms pass through between their interstices, when the said trays move upwards, picking up the articles resting thereon, crossbars on which the upper parts of the rods forming the chute are rigidly fixed, two blocks parallel to the latter, and each carrying one end of the said crossbars, two racks, one fitted on the underside of each of the said blocks, two stationary guide tubes for the said rack blocks to slide in, openings, one arranged in the lower side of each of the said guide tubes, pinions meshing with the said racks and reaching them with their upper parts through the said openings, a shaft common to the said pinions and revolubly mounted in stationary supports, means for rotating the said shaft, bosses to serve as guides during loading, provided at one and the same side of each of the said trays, and two opposite guideboards fixed alongside the above named section so as to include the said bosses.

13. In an apparatus of the kind described, in combination a pair of parallel endless chains, a loop included in the course of the said chains, a vertical section forming part of the said loop and connected to the entrance to the treating zone of the apparatus, a plurality of trays revolubly suspended from and between the said chains, a platform arranged in each of the said trays for holding the articles under treatment and consisting of a row of parallel rods fixed with one end in the backpart of the said trays, the other end being free, a loading chute extending across the width of the said section, inclined downwards toward the same and composed of a lower movable member and an upper stationary one, a row of parallel rods forming the movable member of the said chute, bent upwards at their lower ends and so arranged that the rods forming the said platforms pass through between their interstices, when the said trays move upwards, thus picking up the articles resting thereon, crossbars on which the upper parts of the rods of this movable member are rigidly fixed, two blocks parallel to the latter, and each carrying an end of the said crossbars, two racks, one fitted on the underside of each of the said blocks, two guide tubes, one for each of the said rack blocks, two stationary supports on which the said guide tubes are rigidly mounted, openings—one arranged in the lower side of each of the said guide tubes, pinions meshing with the said racks and reaching them with their upper parts through the said openings, a shaft common to the said pinions and revolubly mounted in the said stationary supports, means for rotating the said shaft, a row of parallel stationary rods constituting the upper member of the said loading chute and extending with their lower parts between the interstices of the upper parts of the rods forming the movable member of the said chute, the upper ends of the latter and the lower ends of the former being bent downwards, bosses to serve as guides during loading, provided at one and the same side of each of the said trays, and two opposite guideboards fixed alongside the above named section so as to include the said bosses.

14. In an apparatus of the kind described, in combination a pair of parallel endless chains, a loop included in the course of the latter, a vertical section forming part of the said loop and connected to the entrance to the treating zone of the apparatus, a plurality of trays suspended from and between the said chains, platforms, one provided in each of the said trays for supporting the articles under treatment, backbars extending the whole width of each of the said trays and carrying affixed therein the said platforms, side brackets rigidly joining each of the said platforms and backbars together, flange-like projections extending outwards, one from the upper part of each of the said brackets nearly to the said chains, shafts fixed in the said flange-like projections and revolubly mounted in the said chains, bosses, one extending at each of the said trays from the lower part of one and the same side bracket thereof nearly to the said chains, and two upright guideboards arranged opposite to each other along the said section parallel to the said chains in such a position as to include the said flange-like projections and the said bosses of the said trays passing upwards along the said section, the said flange-like projections and the said bosses being so situated at the said brackets, that, gliding upwards between the said guideboards, they keep the said platforms in an inclined position, the front part of the latter pointing upwards at the required angle for being loaded.

15. In an apparatus of the kind described, in combination a pair of parallel endless chains, a loop included in the course of the latter, a vertical section forming part of the said loop and connected to the exit from the treating zone of the apparatus, a plurality of trays suspended from and between the said chains, platforms, one provided in each of the said trays for supporting the articles under treatment, backbars extending the whole width of the said trays and carrying affixed therein the said platforms, side brackets rigidly joining each of the said platforms and backbars, flange-like projections extending outwards, one from about the middle part of each of the said brackets nearly to the said chains, shafts fixed in the said flange-like projections and revolubly mounted in the said chains, bosses, one extending at each of the said trays from one and the same side bracket thereof at a point above the said flange-like projections nearly to the said chains, and two upright guideboards arranged opposite to each other along the said section parallel to the said chains and in such a position as to include the said flange-like projections and bosses of the said trays passing downward the said section, the said flange-like projections and the said bosses being so situated at the said brackets, that, gliding downwards between the said guideboards, they keep the said platform in a horizontal position for the discharge of the treated articles.

16. In an apparatus of the kind described, in combination a pair of parallel endless chains, a loop included in the course of the latter, a vertical section forming part of the said loop and connected to the exit from the treating zone of the apparatus, a plurality of trays suspended from and between the said chains, platforms, one provided in each of the said trays for supporting the articles under treatment and consisting of a row of rods fixed with one end in the backpart of the said trays, the other end being free, side brackets joining in each of the latter their backparts and the said platforms, flange-like projections extending outwards, one from the middle part of each of the said brackets nearly to the said chains, shafts fixed in the said flange-like projections and revolubly mounted in the said chains, bosses, one extending at each of the said trays from one and the same side bracket thereof at a point above the said flange-like projections nearly to the said chains, two upright guideboards arranged opposite to each other along the said section parallel to the said chains and in such a position as to include the said flange-like projections and bosses of the said trays when passing downward the said section, so that they keep the said platforms in a horizontal position for unloading, a stationary chute for this purpose, arranged across and inclined downward from the said section and composed of a row of rods, the upper part of which is free and so arranged that the rods forming the said platforms pass freely between their interstices, leaving thereon the treated articles, and stationary supports in which the rods forming the said chute are fixed.

17. In an apparatus of the kind described, in combination a pair of parallel endless chains, a loop included in the course of the latter, a vertical section forming part of the said loop and connected to the exit from the treating zone of the apparatus, a plurality of trays suspended from and between the said chains, platforms, one provided in each of the said trays for supporting the articles under treatment and consisting of a row of parallel rods fixed with one end in the backparts of the said trays, the other end being free, side brackets joining in each of the latter their backparts and the said platforms, flange-like projections extending outwards, one from the middle part of each of the said brackets nearly to the said chains, shafts fixed in the said flange-like projections and revolubly mounted in the said chains, bosses, one extending at each of the said trays from one and the same side bracket thereof at a point above the said flange-like projections nearly to the said chains, two upright guideboards arranged opposite to each other along the said section parallel to the said chains and in such a position as to include the said flange-like projections and bosses of the said trays when passing downward the said section so that they keep the said platforms in a horizontal position for unloading, a stationary chute for this purpose, arranged across and inclined downward from the said section and composed of a row of rods, the upper part of which is free and so arranged that the rods forming the said platforms pass freely between their interstices, leaving thereon the treated articles, a stout bar extending across the width of the said chute and provided with openings in which the down-bent lower ends of the rods forming the latter are rigidly fixed, a conveyer running alongside the said bar with ample velocity to carry away the articles sliding down thereon from the said chute, and an upright board placed opposite to the said bar alongside the said conveyer adapted to prevent articles from dropping over the side of the latter.

18. In an apparatus of the kind described, in combination a pair of parallel endless chains, a loop included in the course of the latter, two vertical sections forming the end parts of the said loop, one connected to the entrance to, and the second one to the exit from the treating zone of the apparatus, means for revolving the said chains, upwards in the first named section and downwards in the last named section, a plurality of trays suspended from and between the said chains, platforms, one provided in each of the said trays for supporting the articles under treatment and consisting of parallel rods fixed with one end in the backparts of the said trays, the other end being free, side brackets, two provided for each of the latter, one for each side, small shafts revolubly mounted in the said chains vertically to their course and fixed to the said side brackets above the center of gravity of the said trays, flange-like projections, in which the said shafts are fixed to the said side brackets, and extending therefrom nearly to the said chains, bosses, extending from each of the said side brackets nearly to the said chains, one half of their number being situated at one side of the said trays below the said flange-like projections, and the other half at the opposite side of the said trays above the said flange-like projections, two upright guideboards fixed opposite to each other alongside the first named section of the said loop in such a position as to include, when the trays pass upwards the same, the said bosses situated below the said flange-like projections and the latter, so that they keep the said platforms in an upward inclined position for loading, a loading chute extending across the first named section, inclined downwards toward the same and consisting of an upper stationary and a lower movable part, a row of parallel rods, free in their lower part and bent upwards at their lower end, forming the movable part of the said chute and so arranged that the rods forming the said platforms of the said trays, when travelling upwards this section, pass freely through between carrying with them the articles contained thereon, means adapted to regulate the position of the movable part of the said chute, so that the distance of the lower ends of the latter from the front ends of the said platforms corresponds to the length of the articles to be placed thereon, two upright guideboards fixed alongside the second-named section of the said loop in such a position as to include, when the said trays pass downwards the same, the said bosses situated above the said flange-like projections and the latter, so that they keep the said platforms in a horizontal position for unloading, a stationary unloading chute arranged across and inclined downwards from this section and composed of a row of rods, the upper part of which is free and so arranged that the rods forming the said platforms, travelling downwards, pass freely between their interstices, leaving thereon the treated articles, a stout bar extending across the width of the said unloading chute and provided with openings in which the down-bent lower ends of the rods forming the latter are rigidly fixed, and a conveyer running alongside the said bar with such velocity as to carry quickly away the articles sliding down thereon from the said chute.

19. In an apparatus of the kind described, in combination a pair of parallel endless chains, a loop included in the course of the said chains, two vertical sections in the said loop, one connected to the entrance to and the other one to the exit from the treating zone of the apparatus, a plurality of trays holding the articles under treatment, shafts—one provided at each side of the said trays—revolubly mounted in the said chains, bosses provided at the said trays and extending—one from each side thereof—nearly to the said chains, the bosses at one and the same side of the said trays serving as guides during loading and those at their opposite side during unloading, four channel irons forming part of the framework of the apparatus and fixed—one along each side of the said vertical sections—with the outside surface of their bottom vertically to the said shafts and closely to their ends protruding from the said chains, and eight angle irons—two bolted parallel to each other with one side to the bottom of each of the said channel irons, their upright sides being at that side of the said vertical sections, where the said bosses are active, of sufficient height to include the latter and the said chains, while at the opposite side of the same, where the bosses remain inactive, they are so low as to inclose only the said chains.

20. In an apparatus of the kind described, in combination a pair of parallel endless roller chains, a plurality of trays revolubly suspended from and between the said chains in an inclined position, the distance of the axes, round which the said trays turn, from the tip of their front being greater than that from the end of their backpart, sprocket wheels for the said chains to run on, being in accordance with the difference of these distances larger in diameter at those points where the tips of the front of the said trays point inside, and smaller where they point outside these sprockets, a series of superimposed horizontal courses of the said chains forming the treating zone of the apparatus, angle irons fixed in the framework of the apparatus parallel to the said horizontal courses so as to serve with their horizontal sides as supports for the rollers of the said chains, while their vertical sides prevent side movements of the latter, a loop included in the course of the said chains and having two vertical sections, one connected to the end of the upmost and the other one to the end of the lowest one of the said horizontal courses, bosses projecting from the sides of the trays nearly to the said chains, those at one side serving as guides during loading, and those at the opposite side during unloading, four channels fixed parallel to and one at each side of the vertical sections of the said loop pointing towards each other and so arranged that their bottoms prevent side movements of the said chains, one of these channels situated at that side of the first named vertical section of the said loop where the said loading bosses of the trays travelling upwards, pass, having sides so high and so arranged that the rollers of the said chains and these bosses closely glide between them, the latter and this channel acting together to keep the said trays in an inclined position for loading, a second one of these channels, situated at that side of the second-named vertical section of the said loop, where the unloading bosses of the said trays travelling downwards pass, having sides so high and so arranged that the rollers of the said chains and these bosses closely glide between them, the latter and this channel acting together to keep the said trays in a horizontal position for unloading, and the two other channels situated at the sides of the two vertical sections, where the bosses of the said trays remain inactive, having sides so low and so arranged as to allow only the rollers of the chains to glide between them.

GUSTAV BERNHARD EGGERT.